United States Patent [19]

Kawai

[11] Patent Number: 5,126,984
[45] Date of Patent: Jun. 30, 1992

[54] EXTERNAL MAGNETIC FIELD GENERATING DEVICE FOR OPTICAL MAGNETIC DISK APPARATUS

[75] Inventor: Toshihiko Kawai, Kawasaki, Japan

[73] Assignee: Nikon Corporation, Tokyo, Japan

[21] Appl. No.: 591,875

[22] Filed: Oct. 1, 1990

[30] Foreign Application Priority Data

Oct. 4, 1989 [JP] Japan .................. 1-257883

[51] Int. Cl.⁵ .................. G11B 11/14; G11B 3/00; G11B 5/02; G11B 5/127
[52] U.S. Cl. .................. 369/13; 369/127; 369/146; 360/59; 360/114
[58] Field of Search .................. 369/13, 146, 127; 360/114, 59, 57, 60, 66; 365/122

[56] References Cited

U.S. PATENT DOCUMENTS

| | | | |
|---|---|---|---|
| 4,644,431 | 2/1987 | Kishine et al. | 360/122 |
| 4,731,683 | 3/1988 | Otomo et al. | 360/122 |
| 4,748,606 | 5/1988 | Naito et al. | 360/114 |
| 4,849,952 | 6/1989 | Shiho | 369/13 |
| 4,901,185 | 2/1990 | Kubo et al. | 360/603 |

FOREIGN PATENT DOCUMENTS

| | | |
|---|---|---|
| 60-147948 | 8/1985 | Japan . |
| 0278059 | 12/1986 | Japan .................. 360/114 |
| 0014352 | 1/1987 | Japan .................. 360/114 |
| 62-65202 | 3/1987 | Japan . |

Primary Examiner—Stuart S. Levy
Assistant Examiner—Tan Nguyen
Attorney, Agent, or Firm—Shapiro and Shapiro

[57] ABSTRACT

An external magnetic field generating device for an optical magnetic disk apparatus is arranged radially of the disk and is used to record information on and erase information from the disk by a laser beam. A surface of the external magnetic field generating device which is remote from the optical magnetic recording disk is made substantially parallel to the disk surface so as to facilitate mounting of the device. A surface of the external magnetic field generating device which faces the disk includes an inclined portion and is shape such that the intensity of the external magnetic field increases as the magnetic field approaches an outer end of the device so as to enable appropriate recording and erasing at both inner and outer peripheries of the disk.

6 Claims, 4 Drawing Sheets

EXTERNAL MAGNETIC FIELD GENERATING DEVICE FOR OPTICAL MAGNETIC DISK APPARATUS

BACKGROUND OF THE INVENTION

1. Field of the Invention

The present invention relates to an external magnetic field generating device for an optical magnetic disk apparatus which is suitably used when information is recorded on or erased from an optical magnetic disk by means of a laser beam.

2. Related Background Art

When magneto-optic information is recorded on an optical magnetic disk by means of a laser beam, a laser beam digitally modulated by an information signal is irradiated onto a film magnetized in one vertical direction beforehand to heat the vertically magnetized film to a temperature higher than the Curie point while a direct-current bias direction of a magnetic field which is opposite to that in which the film is magnetized is applied to the film by an external magnetic field generating device. When cooled, the film is magnetized in a direction opposite to that in which the surrounding portion is magnetized, whereby a row of recording bits is formed on the magnetic disk in accordance with the information. When the recording bits are erased, a non-modulated laser beam is irradiated on the recording bits to heat the bits to a temperature higher than the Curie point, and the vertically magnetized film is magnetized again by the direct-current bias in the same direction as that in which the surrounding portion is magnetized when it is cooled.

More particularly, information is recorded on and erased from the optical magnetic disk by heating the vertically magnetized film to a temperature higher than the Curie point and thereby demagnetizing the portion of the film irradiated by the laser beam and then by magnetizing that portion in the same direction as that of the direct-current bias, e.g., in the direction opposite to that in which the surrounding portion is magnetized. The direction of the direct-current bias applied to the magnetized film during recording is opposite to that which is applied during erasure.

While information is recorded on or erased from the optical magnetic disk, the laser beam gradually moves sequentially or stepwise in the radial direction of the disk which is rotated at a fixed speed. In consequence, the amount of light energy per unit time absorbed by the outer peripheral portion of the magnetized film differs from that absorbed by the inner peripheral portion thereof, making uniform and appropriate recording and erasure impossible.

Accordingly, it has been proposed to vary the intensity of the laser beam in accordance with the irradiating position, i.e., to gradually increase the intensity of the laser beam as the laser beam approaches the outer periphery of the optical magnetic disk, while the intensity of the external magnetic field remains constant. It has also been disclosed (in, for example, Japanese Patent Appln. Laid-Open No. 60-147948) to change the intensity of the external magnetic field in accordance with the laser beam irradiating position while the intensity of the laser beam remains constant. In the former technique it is difficult to maintain the intensity of the laser beam constant, and a complicated control circuit is necessary. Therefore, the latter technique is generally adopted.

FIG. 7 shows a conventional example of an external magnetic field generating device employed in the latter technique. An external magnetic field generating device 61 includes a main yoke 62 and an exciting coil 63 wound around the main yoke 62. The external magnetic field generating device 61 is disposed close to and in opposed relation to the surface of an optical magnetic disk 4 which is opposite to that irradiated by a laser beam 5 in such a manner that the longitudinal direction of the main yoke 62 coincides with the radial direction of the optical magnetic disk 4. Also, the external magnetic field generating device 61 is inclined by an angle $\theta$, i.e., a gap between an outer end "a" of the main yoke 62 and the surface of the disk is smaller than that between an inner end "b" of the main yoke 62 and the disk surface, such that the intensity of the magnetic field generated by the external magnetic field generating device 61 gradually increases as the magnetic field approaches the outer periphery of the optical magnetic disk 4, as shown by a solid line 66 in FIG. 8.

In a case where the former technique in which the intensity of laser beam 5 is changed is adopted, the external magnetic field generating device 61 is disposed parallel to the surface of the disk to obtain a magnetic field intensity indicated by a broken line 67 in FIG. 8.

However, since the above-described conventional external magnetic field generating device must be provided in an inclined state relative to the optical magnetic disk, mounting and adjustment thereof are a troublesome task as compared with the case in which the external magnetic field generating device is disposed parallel. Furthermore, the portion of the external magnetic field generating device located close to the outer periphery of the disk must be closer to the disk surface than the portion thereof located near the center of the disk. A gap from 1 to 1.5 mm is required in minimum between the disk surface of the external magnetic field generating device even when a flat magnetic field is obtained. Thus, there is a limitation to the distance between the disk surface and the external magnetic field generating device from the viewpoint of vibrations of the disk surface.

Paying attention to the intensity of the external magnetic field, since the portions of the magnetic field intensity corresponding to the two end portions "a" and "b" are excessively higher than the central flat portion thereof due to the edge effect, as shown in FIG. 8, it is impossible to obtain a distribution of the magnetic field intensity which is linearly inclined over the entire recording area A of the optical magnetic disk 4. Attempts have also been made to use only a central linearly inclined magnetic field intensity area B. However, this requires a long external magnetic field generating device, as shown in FIG. 9. Also, the external magnetic field generating device must be constructed such that the magnetic field intensity portions C caused by the edge effect correspond to the portion of the disk located outside of the recording area thereof, as shown in FIG. 10. This increases the size of the device.

Furthermore, to prevent generation of the edge effect, it has conventionally been proposed to obtain a uniform magnetic field by inclining the inner and outer end portions of the surface of the main yoke which is opposed to the disk (Japanese Patent Appln. Laid-Open No. 62-65202). However, this requires that the external magnetic field generating device be disposed inclined relative to the disk surface, and thus makes mounting difficult. Also, the conventional edge effect generation prevention method is not effective because it wastes a strong magnetic field.

SUMMARY OF THE INVENTION

An object of the present invention is to provide an external magnetic field generating device which is capable of effectively utilizing an intensified magnetic field area caused by the edge effect, which would be thought essentially inadequate.

Another object of the present invention is to provide an external magnetic field generating device which is capable of generating an intensified magnetic field without the size of the device being increased, which is capable of enlarging a linearly inclined magnetic field intensity area, and which can be readily mounted or adjusted.

To this end, the present invention provides an external magnetic field generating device for applying an external magnetic field to an optical magnetic disk which is disposed close to the disk in such a manner that the longitudinal direction of the device coincides with the radial direction of the optical magnetic disk. The surface of the external magnetic field generating device which is remote from the optical magnetic disk is made substantially parallel to the surface of the disk, and the surface thereof which faces the disk surface is inclined from the inner end thereof to a position located in the vicinity of the outer end thereof such that the intensity of the magnetic field generated increases as the magnetic field approaches the outer end of the disk surface.

In the present invention, the surface of the external magnetic field generating device which is opposite to that which faces the disk surface is made parallel to the disk surface and is not inclined relative to the optical magnetic disk. In consequence, mounting and adjustment of the external magnetic field generating device are simplified, requiring less time as compared with the case in which the entire device is disposed in an inclined state.

Since the surface of the external magnetic field generating device which faces the disk surface is inclined from the inner end thereof to a position located in the vicinity of the outer end thereof such that the intensity of the magnetic field generated increases as the magnetic field approaches the outer end of the disk surface, the intensity of the magnetic field located near the outer end enhances due to the edge effect. However, when the position located near the outer end is defined such that the gradient of an inner rising portion of the intensified magnetic field substantially coincides with that of the central, linearly inclined magnetic field intensity area, the linearly inclined magnetic field intensity area, including the portion thereof affected by the edge effect, is enlarged. In this way, the intensity of the magnetic field caused by the edge effect is effectively utilized to obtain an intensified magnetic field. As a result, an increase in the current value or provision of the device close to the disk surface can be eliminated. Furthermore, enlargement of the linear magnetic field intensity area enables reduction in the size of the device.

DETAILED DESCRIPTION OF THE PREFERRED EMBODIMENTS

The present invention will now be described by way of example with reference to the accompanying drawings.

Figure 1:
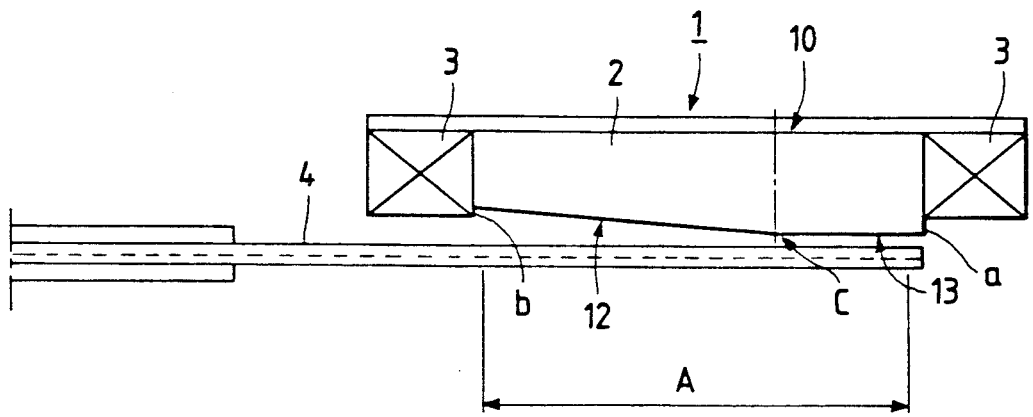
FIG. 1 is a side elevational view of a first embodiment of an external magnetic field generating device according to the present invention.

FIG. 1 is a side elevational view of a first embodiment of an external magnetic field generating device for an optical magnetic disk apparatus according to the present invention. An external magnetic field generating device includes the main yoke 2 and the exciting coil 3. The main yoke 2 has substantially the same length as that of the recording area A of the optical magnetic disk 4, and is disposed close to and in opposed relation to the optical magnetic disk 4 in such a manner that the longitudinal direction thereof coincides with the radial direction of the optical magnetic disk 4. A surface 10 of the main yoke 2 which is remote from the optical magnetic disk 4 is made parallel to the optical magnetic disk 4. A surface of the main yoke 2 which faces the optical magnetic disk 4 includes an inclined surface 12 which is inclined by an appropriate angle such that the thickness thereof gradually increases and which extends from an end "b" (inner end) of the main yoke 2 located close to the inner periphery of the disk to a position "c" located near the outer periphery of the disk, and the remaining portion 13, i.e., a parallel surface 13 which extends from the position "c" to an end "a" (outer end) located near the outer periphery of the disk and which is parallel to the surface of the disk.

Figure 2:
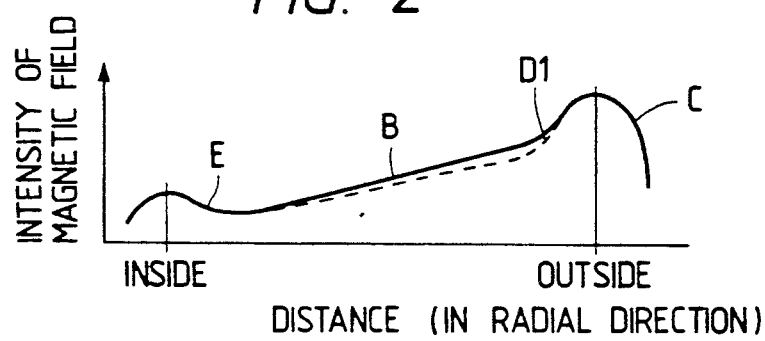
FIG. 2 is a graph showing the relation between the intensity of the magnetic field and the distance in the radial direction of a disk in the first embodiment of FIG. 1.

That is, the thickness of the main yoke 2 is gradually changed in the radial direction of the disk so as to allow the intensity of the magnetic field to be gradually increased from the inner end "b" to the outer end "a", as shown in FIG. 2.

The position c is adjusted to an optimum position with the magnetic field intensity C caused by the edge effect of the outer end "a" taken into consideration. That is, as the position "c" moves in the longitudinal direction of the main yoke 2, the linearly inclined magnetic field intensity area B generated by the inclined surface 12 increases or decreases while the gradient of the area B changes due to the change in the angle of the inclined surface 12. Thus, when the position "c" is moved toward the outer end "a", the magnetic field intensity C caused by the edge effect of the outer end "a" interacts with the linearly inclined magnetic field intensity area B, and an inner rising portion D1 of the magnetic field intensity C caused by the edge effect and the area B thus rise from the values indicated by the broken line to those indicated by the solid line. This means that the area B is enlarged to the rising portion D1.

It may also be arranged such that the position "c" coincides with the outer end "a" and that the entire surface of the main yoke which faces the disk surface is thereby made inclined. However, this cancels the magnetic field rising effect by the parallel surface 13, and is therefore undesired.

In this external magnetic field generating device, since the upper surface of the main yoke 2 is disposed parallel to the optical magnetic disk 4, mounting and adjustment of the main yoke 2 are facilitated and can be done in a shorter period of time as compared with the case in which the upper surface of the main yoke 2 is inclined to the disk surface. Furthermore, since the magnetic field is intensified utilizing the intensified magnetic field caused by the edge effect of the outer end "a" of the main yoke 2, the main yoke 2 can be separated from the optical magnetic disk 4 accordingly, further facilitating mounting of the device and eliminating increase in the current value supplied to the exciting coil 3. It is therefore possible to provide a small external magnetic field generating device which generates a high intensity of magnetic field.

Figure 3:
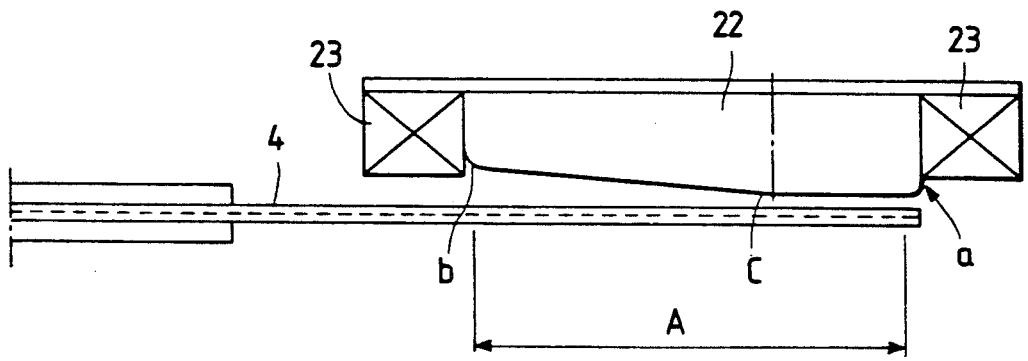
FIG. 3 is a side elevational view of a second embodiment of the present invention.

FIG. 3 is a side elevational view of a second embodiment of the present invention including a main yoke 22 and exciting coil 23. In this embodiment, the outer end "a" and the inner end "b" of the main yoke 22 are rounded such that they have an adequate radius.

Figure 4:
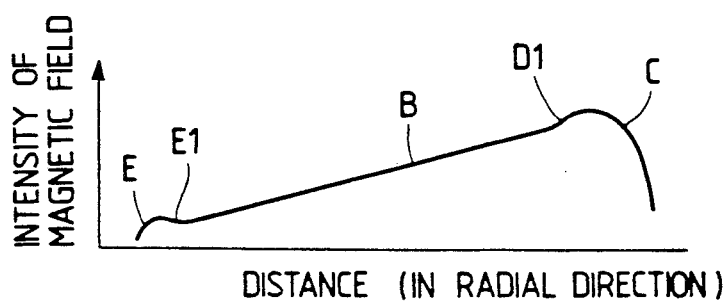
FIG. 4 is a graph showing the relation between the intensity of the magnetic field and the distance in the radial direction of the disk in the second embodiment.

FIG. 4 is a graph showing the intensity of the magnetic field generated by the structure shown in FIG. 3. As is clear from FIG. 4, the magnetic field intensities C and E caused by the edge effect of the ends "a" and "b" can be suppressed due to the rounding of the outer end "a" and the inner end "b" of the main yoke 22. This enables the linearly inclined magnetic field intensity area B to be enlarged. It is, however, to be noted that the magnetic field intensities C and E are not removed completely but that the inner rising portions D1 and E1 are taken into the central area B to enlarge it.

Figure 5:
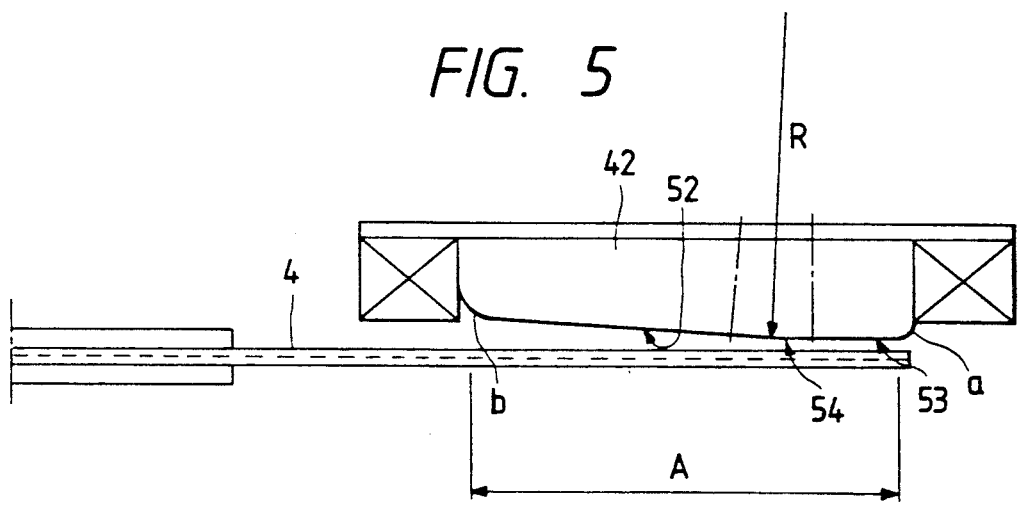
FIG. 5 is a side elevational view of a third embodiment of the present invention.

FIG. 5 shows a third embodiment of the present invention. In this embodiment, the outer end "a" and the inner end "b" of the main yoke are bevelled at an adequate radius. An inclined surface 52 and a parallel surface 53 are connected by a surface 54 curved with a radius of curvature of R so that the entire surface can form a curved surface.

Figure 6:
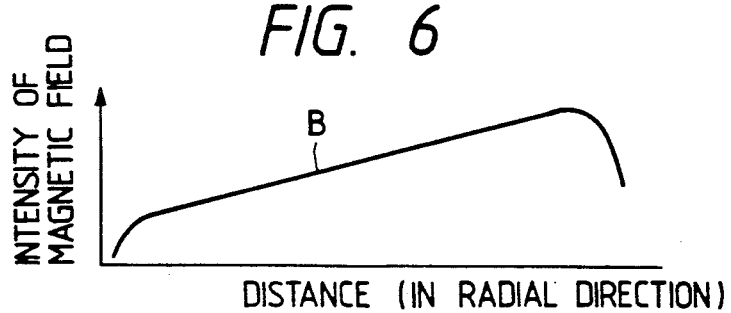
FIG. 6 is a graph showing the relation between the intensity of the magnetic field and the distance in the radial direction of the disk in the third embodiment.
Figure 7:
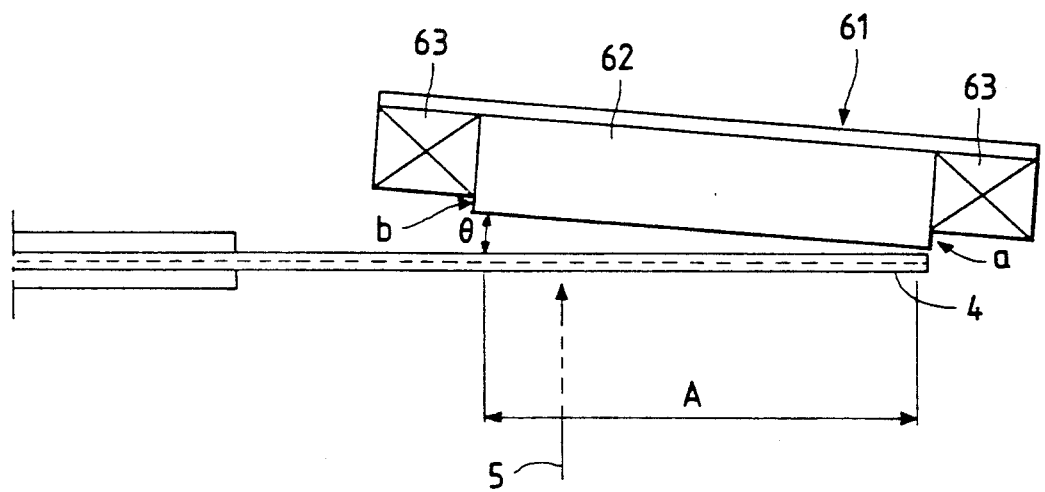
FIG. 7 is a side elevational view of a conventional external magnetic field generating device.
Figure 8:
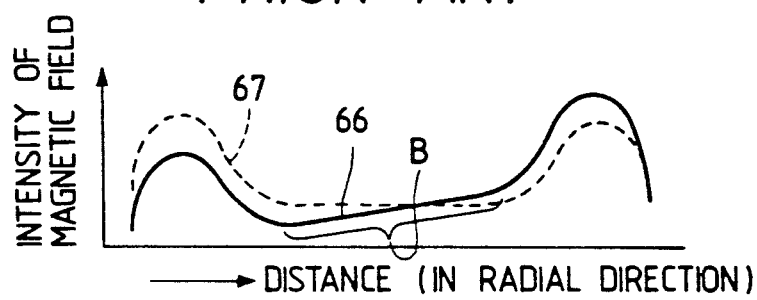
FIG. 8 is a graph showing the relation between the intensity of the magnetic field and the distance in the radial direction of the disk in the device of FIG. 7.
Figure 9:
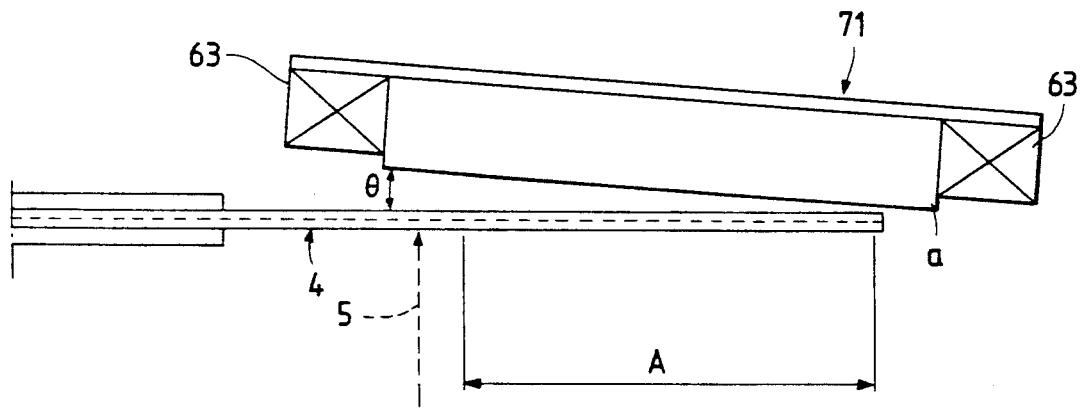
FIG. 9 is a side elevational view of another conventional external magnetic field generating device which is formed large in size to eliminate influence of the edge effect.
Figure 10:
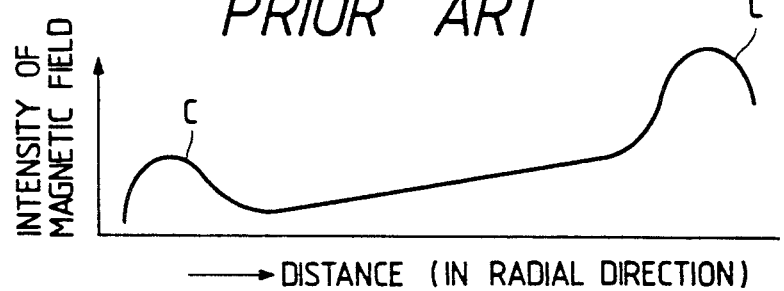
FIG. 10 is a graph showing the relation between the intensity of the magnetic field and the distance in the radial direction of the disk in the device of FIG. 8.

FIG. 6 is a graph showing the intensity of the magnetic field generated by the structure shown in FIG. 5. As is clear from the graph, it is possible to obtain a magnetic field intensity which is inclined linearly over the entire area thereof from which the edge effect is virtually removed. The inner rising portions of the magnetic field intensities caused by the edge effect are flattened due to the curved surface of the main yoke 42, and are taken into the linearly inclined magnetic field intensity area to raise the value thereof, as in the case shown in FIG. 3.

In the above-described embodiments, the external magnetic field generating device employs an electromagnet composed of the main yoke and the exciting coil. However, the present invention is not limited to such an external magnetic field generating device but is also applicable to one which employs a permanent magnet.

I claim:

1. In an external magnetic field generating device for an optical magnetic disk which applies an external magnetic field to an optical magnetic disk and which is disposed close to said disk in such a manner that a longitudinal direction thereof substantially coincides with a radial direction of said optical magnetic disk, the improvement being characterized in that said external magnetic field generating device has a surface remote from said optical magnetic disk and which is substantially parallel to the surface of said disk, and a surface which faces said disk surface and which is shaped such that intensity of said external magnetic field increases in said longitudinal direction as the magnetic field approaches an outer end of said device located close to the outer periphery of said disk from an inner end thereof located close to center of said disk, wherein said surface which faces said disk surface includes a portion which is inclined such that it gradually approaches said disk surface as it approaches aid outer end, and a portion which is substantially parallel to said disk surface located adjacent to said outer end.

2. An external magnetic field generating device according to claim 1, wherein said inclined portion of said surface which faces said disk surface and said substantially parallel portion thereof are connected by a curved surface.

3. An external magnetic field generating device according to claim 1, wherein said surface which faces said disk surface is bevelled in an arc fashion at the inner and outer ends thereof.

4. An external magnetic field generating device for an optical magnetic disk which applies an external magnetic field to an optical magnetic disk, comprising:

a yoke member which is disposed close to said optical magnetic disk in such a manner that a longitudinal direction thereof substantially coincides with a radial direction of said optical magnetic disk, said yoke member having a surface which is remote from said optical magnetic disk and which is substantially parallel to the surface of said disk, as well as a surface which faces said disk surface and which is shaped such that intensity of said magnetic field increases in said longitudinal direction as the magnetic field approaches an outer end of said yoke member located close to the outer periphery of said disk from an inner end thereof located close to center of said disk, wherein said surface of said yoke member which faces said disk surface includes a portion which is inclined such that it gradually approaches said disk surface as it approaches aid outer end, and a portion which is substantially parallel to said disk surface located adjacent to said outer end.

5. An external magnetic field generating device according to claim 4, wherein said inclined portion of said surface of said yoke member which faces said disk surface and said substantially parallel portion thereof are connected by a curved surface.

6. An external magnetic field generating device according to claim 4, wherein said surface of said yoke member which faces said disk surface is bevelled in an arc fashion at the inner and outer ends thereof.

* * * * *